(12) United States Patent
Bristol et al.

(10) Patent No.: US 7,853,661 B2
(45) Date of Patent: Dec. 14, 2010

(54) REMOTE ACCESS AND SOCIAL NETWORKING USING PRESENCE-BASED APPLICATIONS

(75) Inventors: Anthony R Bristol, Issaquah, WA (US); Campbell D Gunn, Redmond, WA (US); Tiffany L Shockley, Los Gatos, CA (US); Todd S Biggs, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 11/275,442

(22) Filed: Jan. 3, 2006

(65) Prior Publication Data

US 2007/0156805 A1    Jul. 5, 2007

(51) Int. Cl.
*G06F 15/16* (2006.01)
(52) U.S. Cl. .................... 709/207; 709/208; 709/202
(58) Field of Classification Search ............... 709/207, 709/202
See application file for complete search history.

(56) References Cited

U.S. PATENT DOCUMENTS

| 6,351,762 | B1 | 2/2002 | Ludwig et al. |
| 2004/0215723 | A1 | 10/2004 | Chadha |
| 2005/0102362 | A1* | 5/2005 | Price et al. ................. 709/206 |
| 2006/0109854 | A1* | 5/2006 | Cancel ....................... 370/401 |

FOREIGN PATENT DOCUMENTS

EP          1225763 A1    7/2002

\* cited by examiner

*Primary Examiner*—Benjamin R Bruckart
*Assistant Examiner*—Shripal K Khajuria
(74) *Attorney, Agent, or Firm*—Lee & Hayes, PLLC

(57) ABSTRACT

Various embodiments utilize a real-time instant messaging or presence based communications system as a mechanism to remotely control the operation, programming, and/or review of media content on a device or system such as a television, media center, gaming device, digital video recorder and the like. In addition, the use of the instant messaging or presence based communication system opens up various social networking options for users. For example, users can, if allowed, gain access to the viewing habits of individuals in their contact list and exchange information with one another to provide a rich, robust sharing environment.

19 Claims, 5 Drawing Sheets

REMOTE ACCESS AND SOCIAL NETWORKING USING PRESENCE-BASED APPLICATIONS

BACKGROUND

Today, a person who wants to interact with a device that consumes media, such as a television or entertainment system that plays programs and movies or, a gaming device (among other devices), typically needs to be present at the device to manage, review, view the programming or otherwise interact with the device.

SUMMARY

Various embodiments utilize a real-time instant messaging or presence based communications system as a mechanism to remotely control the operation, programming, and/or review of media content on a device or system such as a television, media center, gaming device, digital video recorder and the like.

In addition, the use of the instant messaging or presence based communication system opens up various social networking options for users. For example, users can, if allowed, gain access to the viewing habits of individuals in their contact list and exchange information with one another to provide a rich, robust sharing environment.

DETAILED DESCRIPTION

Overview

Figure 1:
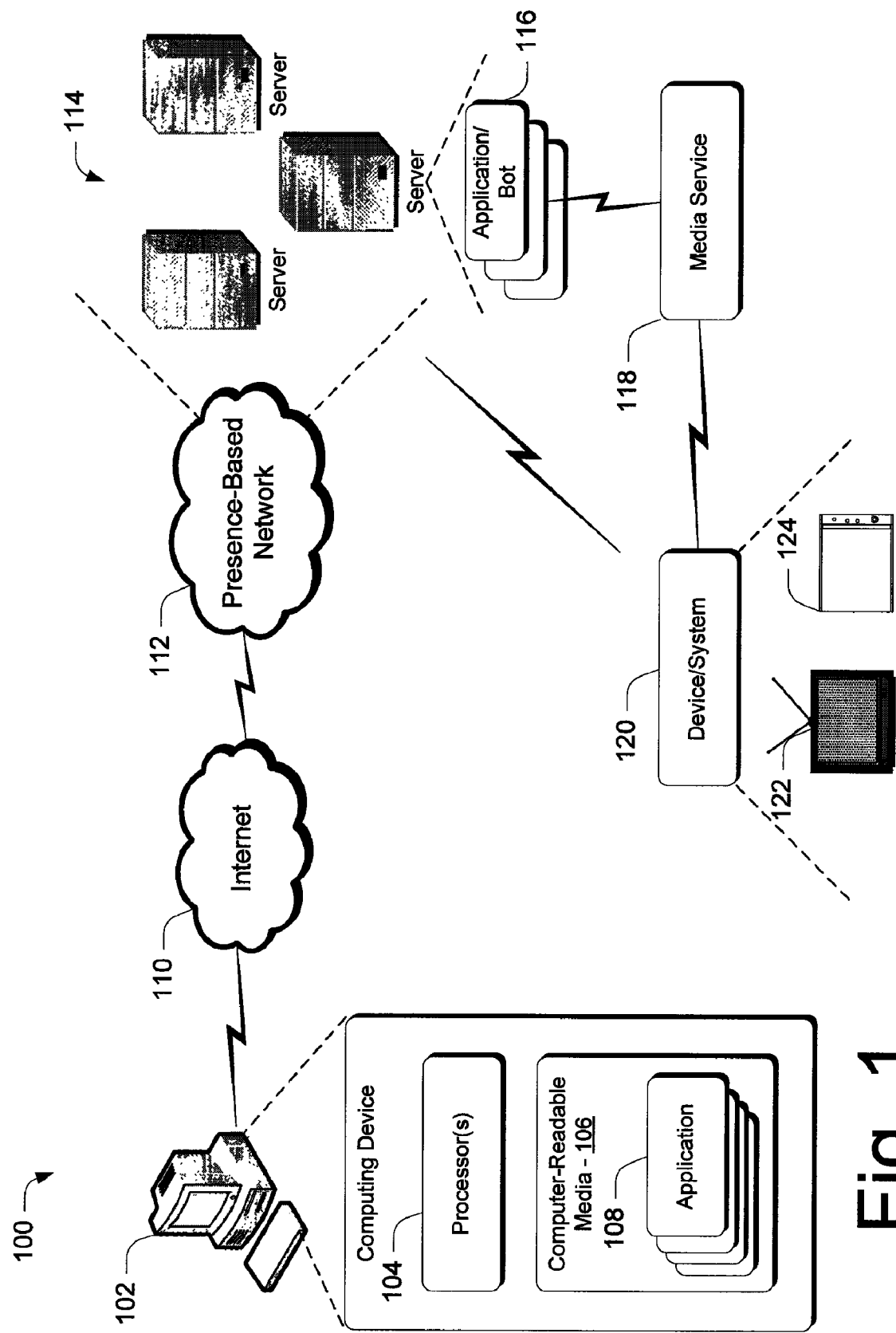
FIG. 1 illustrates a system that includes a presence-based network in accordance with one embodiment.

Various embodiments utilize a real-time instant messaging or presence based communications system as a mechanism to remotely control the operation, programming, and/or review of media content on a device or system such as a television, media center, gaming device, digital video recorder and the like.

In addition, the use of the instant messaging or presence based communication system opens up various social networking options for users. For example, users can, if allowed, gain access to the viewing habits of individuals in their contact list and exchange information with one another to provide a rich, robust sharing environment.

Using a real-time instant messaging or presence-based network, such as a Voice Over IP (VoIP) or voice clip network to manage the process described below provides a unique capability as a person or user can interact with an application or BOT (short for "robot") on the network to access, interact with, and/or program their device. In contexts where the device resides in the form of a media center or television, such interaction can allow a user to record programs, review programs that have been recorded, interact with the application or BOT to receive recommendations for programs to view based on the programs that they have recorded, reviewed, or asked questions about, and receive notifications about new programming that the system determines or the user has indicated would be of interest to them.

In the discussion that follows, the notion of a presence based network is first discussed to provide the reader who is unfamiliar with such networks some context for appreciating the described embodiments. Following this, a discussion of the inventive embodiments in the context of a presence based network is provided.

Presence in General

The notion of presence typically implies the use of a server or service that runs and keeps online users updated with each other's contacts' online status. That is, in a presence based network, users can identify so-called contacts—the same or similar to those that appear in the user's email address list. Whenever a contact is online, the presence based network notifies the user so that the user can leverage the services provided by the network—such as instant messaging, peer-to-peer file exchange and the like. That is, the presence based network can enable contacts that are online together to communicate in a real-time fashion.

One commercially-available software product that provides presence capabilities is MSN Messenger, although other products are available. MSN Messenger is a rich, integrated real-time communications experience in Windows® XP that enables people to effortlessly see, talk, work and play with friends, family and colleagues, whenever and however they choose using their personal computer. MSN Messenger also includes presence and notification features to keep users updated when their contacts are online and let users know their current status.

Various embodiments described below can leverage the functionality provided by a presence-based network. It is to be appreciated and understood that MSN Messenger constitutes but one exemplary application that can be utilized in this context. As such, other applications can be utilized without departing from the spirit and scope of the claimed subject matter.

Exemplary Presence-Based Network

As an example of a presence-based network in accordance with one embodiment, consider FIG. 1 which illustrates such a network or system generally at 100. System 100 includes one or more computing devices 102 each of which includes one or more processors 104, one or more computer-readable media 106 and one or more applications 108 tat reside on the computer-readable media and which are executable by the processor(s). In at least one embodiment, one of the applications resides in the form of an instant messaging application, such as MSN Messenger.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

System 100 also includes a network, such as the Internet 110 that is used by computing device 102 to communicate with a presence-based network 112. Any suitable protocols can be utilized to enable communication between computing device 102 and presence based network 112.

As shown, presence-based network 112 includes one or more servers 114 that implement the presence environment, as will be appreciated by the skilled artisan. The presence-based network can be one tat includes or supports the use of instant messaging, VoIP, voice clips and the like—all of which can permit a user of computing device 102 to communicate with the network. Instant messaging, VoIP and voice clip protocols will be understood by the skilled artisan and, for the sake of brevity, are not further described here.

In at least some embodiments, the presence-based network includes one or more applications or bots 116, typically hosted by or on a server 114, which communicate with a user of computing device 102 (through any suitable means such as instant messaging, VoIP, voice clips and the like), as well as with a media service 118 that provides access to various media, such as television programs, online games and the like. An example of such as media service is one that is provided by MSN TV, as will be appreciated by the skilled artisan. Media service 118 can either host or have access to an electronic program guide service that exposes program guide data which can be used by the user to make programming decisions.

In addition, system 100 includes one or more device/systems 120 on which media provided by media service 118 can be consumed by the user. Examples of such devices/systems include by way of example and not limitation televisions 122, game devices 124, as well as other devices such as computing devices, digital video recorders (DVRs), mobile phones, personal media device (for showing videos or listening to music, and personal computers running, for example, Windows® Media Center.

In at least some embodiments, media service 118 maintains data that pertains to many individual users' consumption of media content. This data can include, by way of example and not limitation, data that pertains to user viewing habits (such as programs that a user watches), user or service ratings information, user profiles (such as programs, actors, or characteristics of programs that the user find desirable), and the like.

In operation, application or bot 116 is, in one embodiment, an advocate for a user s television habits. That is, bot 116 can make recommendations to the user and can provide the user with remote access to their device or system 120 (via computing device 102) so that the user can interact with or otherwise control their device or system. In addition, as described below in more detail, in at least some embodiments, bot 116 understands what a user's contacts are viewing, what the contacts have recorded and the like, and can thus provide a social networking experience that enables a rich and robust sharing interaction among users.

As such, the bot serves as a conduit of information that projects information based on a user's likes and dislikes. The bot is able to provide and support these features, as well as others, by leveraging the use of the presence-based network. More specifically, in at least one embodiment, the hot is programmed or otherwise configured in a manner that allows the user to have a conversation with the bot using a human-like communication channel. Such human-like communication channel can reside in the form of an instant messaging channel that permits textual conversation to be exchanged. Alternately or additionally, this communication channel can reside in the form of a real time communication channel that supports VoIP or voice clips, as will be appreciated by the skilled artisan.

In embodiments that utilize an instant messaging channel to enable a user to engage bot 116, bot 116 resides in the form of a contact that can be added to the user's contact list. In one embodiment, a contact list is a list of users on the presence based network for which a particular user views and publishes their presence. For example, bot 116 might have a name such as TVBuddy@microsoft.com such that the bot can be added to the user's contact list. Once added to the user's contact list, any time that the user is online, they can engage the bot if the bot is online as well. Typically, bot 116 will most likely always be online.

Figure 2:
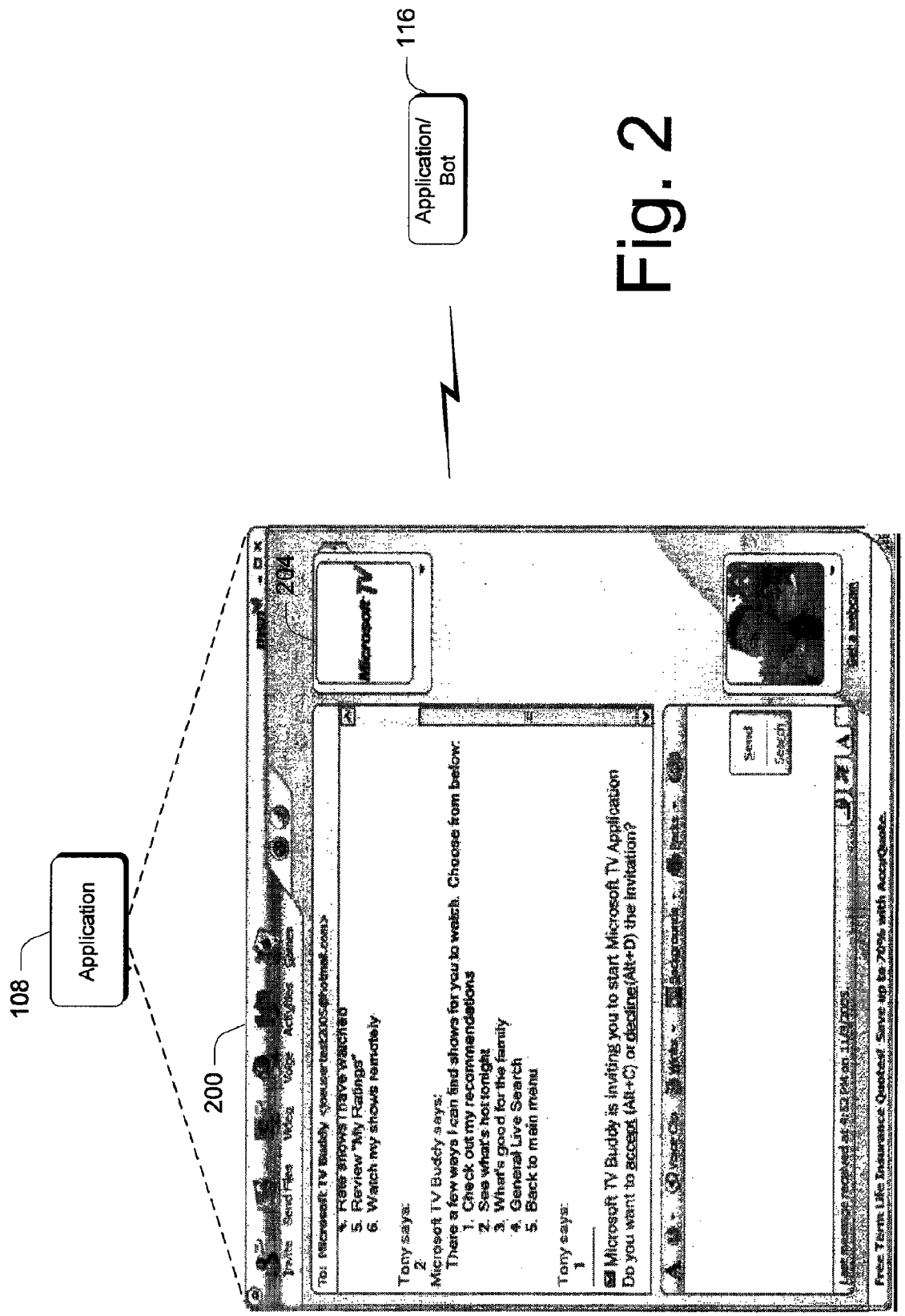
FIG. 2 illustrates an exemplary application in the form of an instant messaging application that exposes a conversation window, and an application/bot in accordance with one embodiment.

As an example, consider FIG. 2 which illustrates, from FIG. 1, an application 108 in the form of an instant messaging application and one application/bot 116. Here, instant messaging application 108 presents, on a user's remote computing device, a so-called conversation window 200 which permits the user to have conversations with various contacts that are online. Notice here that a contact 204 is included in their contact list and corresponds to application/bot 116. Notice also in the conversation window 200 that the user is currently textually engaging the bot (and vice versa). Here, the bot 116 is asking the user to select a way for the bot to find shows for the user to watch. In this instance, user Tony has selected "1" and thus the bot will now use Tony's recommendations to find a show to watch. In this particular example, bot 116 can leverage the data that is maintained by media service 118 (FIG. 1) to come back with a meaningful selection for Tony. In this manner, the user can interact with bot 116 to remotely program, review, or receive recommendations about programming.

In at least some embodiments, bot 116 can be configured to generate various alerts for a user. For example alerts can be opt-in notifications about user specified content of interest, with end-points that include an instant messaging application, an e-mail application and mobile devices (via SMS). Alerts can be s generated on any content or trigger event. In at least some embodiments, alerts can be generated by a system through web service API's which can be hosted as part of the instant messaging network, an example of which is discussed below.

Figure 3:
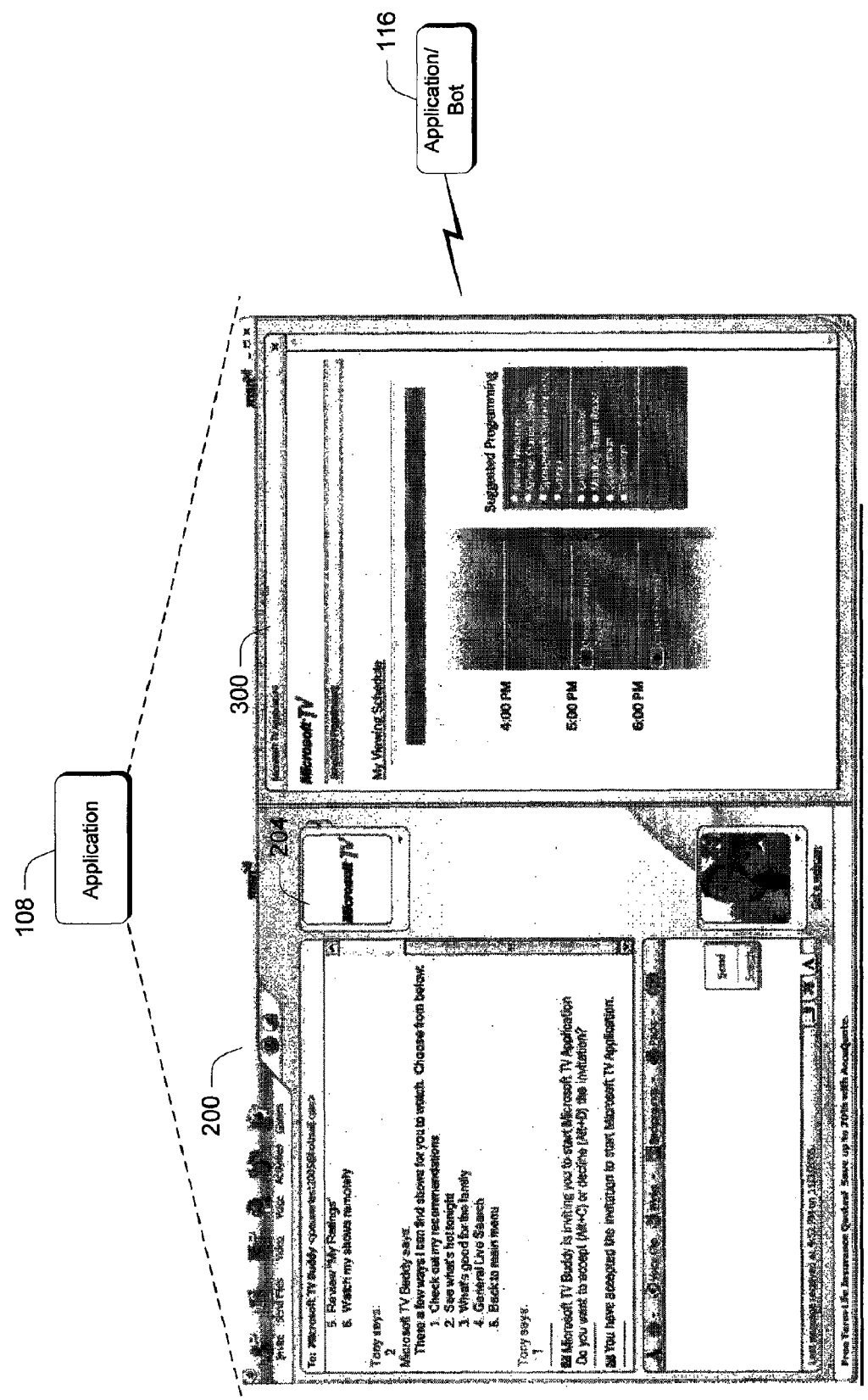
FIG. 3 illustrates FIG. 2's conversation window, along with an activity window that has been opened for a user in accordance with one embodiment.

In at least some embodiments, bot 116 can cause an activity window to be opened on the user's computing device to enable the user to more meaningfully remotely view and make selections. As an example, consider FIG. 3 which shows FIG. 2's conversation window 200, along with an activity window 300 that has been opened for the user. Notice here that the bot 116 is prompting the user to review the available programming to program a device (such as devices 122, 124 in FIG. 1). Activity window 300 displays the programming available based on time, user preferences and the like. Notice also that the user is interacting with bot 116 via both conversation window 200 and with activity window 300. For example, the user has opted, via activity window 300, to record two programs.

The user of an activity window constitutes but one example of how a bot and an application can interact. Other types of interactions can be utilized without departing from the spirit and scope of the claimed subject matter.

Exemplary Method

Figure 4:
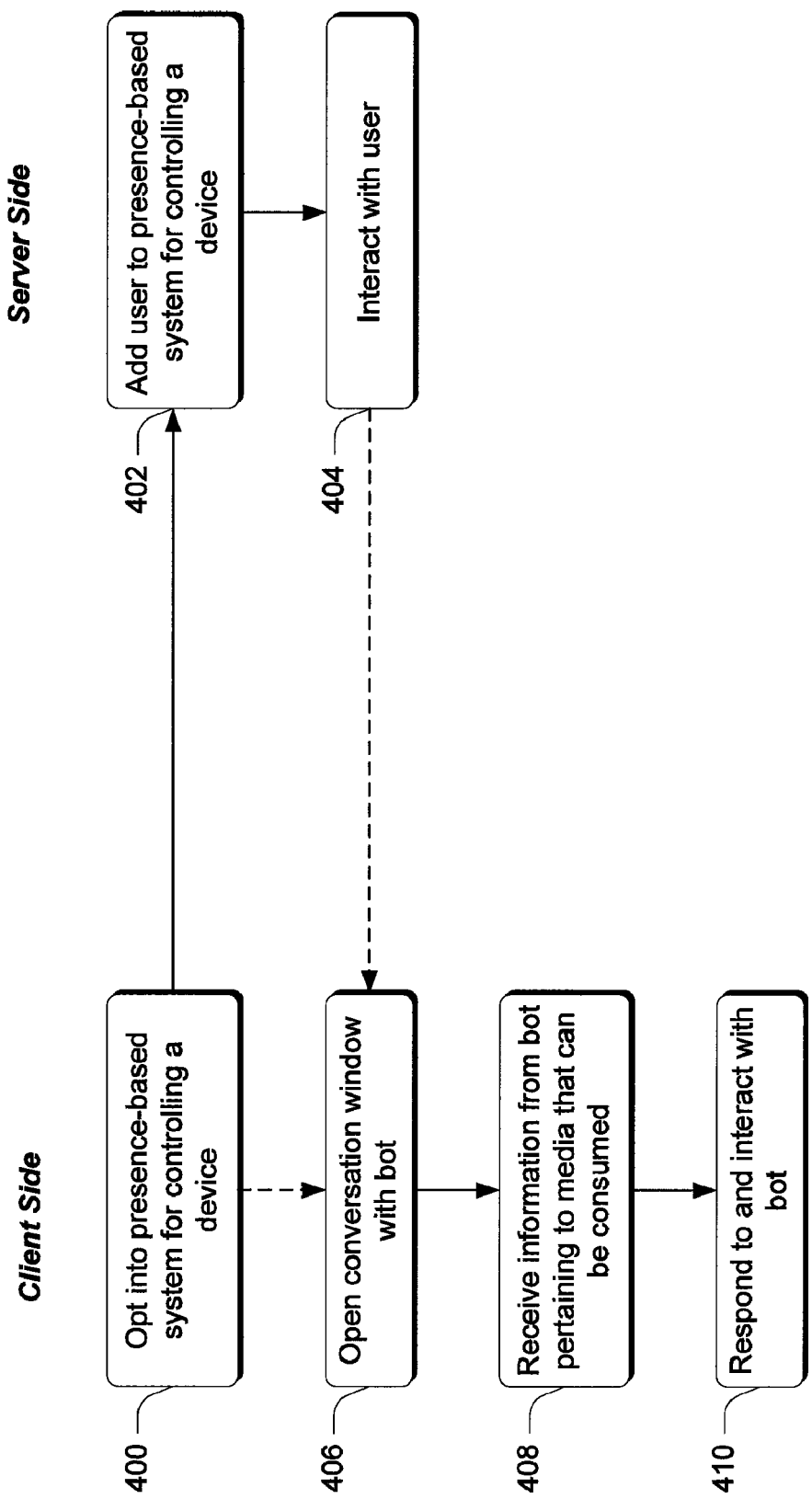
FIG. 4 is a flow diagram that describes steps in a method in accordance with one embodiment.

FIG. 4 is a flow diagram that describes steps in a method in accordance with one embodiment. The method can be implemented in connection with any suitable hardware, software, firmware or combination thereof. In but one embodiment, aspects of the method can be implemented by components of a client-side application, such as an instant messaging application; and, aspects of the method can be implemented by a server-side application or bot. But one example of such a bot is given above and below. It is to be understood that other applications can be utilized without departing from the spirit and scope of the claimed subject matter.

In the discussion that follows, those steps that can be performed by a user or a client side application are designated as "Client Side". Similarly, those steps that can be performed by a server side application or bot are designated as "Server Side".

Step 400 opts into a presence-based system for controlling a device. Examples of presence based systems are given above. This step can be performed in any suitable way. For example, a user can add a bot to their contact list as indicated above. Alternately or additionally, a user can opt into the system through an opt-in process for notifications on an instant messaging network.

Step 402 adds the user to the presence-based system for controlling a device. Step 404 interacts with the user. This step can be performed in any suitable way. Specifically, given the flexibility and access that the presence-based system provides to a wide variety of services, such interaction can take a wide variety of forms. For example, once the user has opted into the system, various events can occur that prompt the bot to interact with the user. For example, programming might be complete for a media service, such as media service 118, such that the user is notified. Alternately or additionally, new programming may be available or a watch list that a user has established for content, dates and programming may be implicated by having a program that meets its criteria played. This can also include, by way of example and not limitation: a bot looking for and purchasing selected programming on behalf of the user when a specified price point has been reached, and notifying the user of the purchase; a bot notifying the user of system status (disk full, only room for two more programs, hardware failure, software upgrades available that would enable new functionality, etc.); a bot that helps a user manage the synching of recorded or purchased media across multiple devices connected to the hot; an appropriately DRM-enabled bot enabling a user to transfer a purchased media file from one system to another system where, for example, the user might be on vacation; a bot that could help manage child safety viewing habits by being able to manage and notify parents of their child's viewing time and show content; a notification to a user when the bot has determined that some interesting pattern of media viewing has taken place within the social network of the user (e.g., more than 3 of the contacts on my contact list have watched a particular movie within the last 24 hours).

The events that are sent to the user can cause the user, at step 406, to open a conversation window to engage the bot. In this case, the conversation window might be opened by the user clicking on a particular UI button on a received notification or event. But one example of a conversation window is provided above.

Alternately or additionally, a user may proactively and without prompting by the bot, open a conversation window, at step 406, so that the user can interact with the bot. For example, a user may be at work and realize that a particular program of interest is going to be broadcast while they are still at work. In this case, the user can access their instant messaging application and click on the TVBuddy icon to open a conversation window with the bot. Once opened, the user can use the conversation window to remotely make their programming/recording selection.

Step 408 receives information from the bot pertaining to media that can be consumed by the user. This information can comprise any suitable type of information, examples of which are given above. In addition, this information can be received using any suitable techniques. For example, such information can be received via the conversation window that was opened in step 406. Alternately or additionally, the information can be received via an activity window, such as the one described above. The information that is received might, for example, be update information that keeps the user informed of the bot's success in accomplishing user-defined tasks (i.e. "successfully set to 'Record' Gonzaga basketball game"). Alternately or additionally, such information might be presented in the form of a menu or indication of options that are available for the user.

Step 410 responds to and interacts with the bot. This step can be performed in any suitable way. For example, the user might simply textually engage the bot in a conversation window. Alternately or additionally, the user might both conversationally engage the bot as well as engage an activity window to take some action. Examples of such actions include, by way of example and not limitation, scheduling the device to record a program, searching for programming to record, performing management functions on the device (deleting recorded programs, managing disk space, scheduling activities, reporting usage, viewing activity, etc.), setting up program reminders, setting up on-going programming searches, remotely viewing trailers of programs of interest or identified by the bot as being potentially of interest and the like.

As can be appreciated from the above discussion, using an application or bot in connection with a presence based network to enable a user to remotely access and interact with a device, such as a television or entertainment device, can provide the user with utilities and functionalities that greatly enhance the user's media consumption experience. Remote access enhances user convenience and provides a degree of flexibility that can permit the user to make programming choices and take related actions whenever they wish to, without requiring them to be physically present at the device.

It is to be appreciated and understood that any suitable application or bot can be utilized to provide the functionality described above, as will be appreciated by the skilled artisan. But one example of such a bot is provided just below.

Exemplary Application/Bot Implementation

Figure 5:
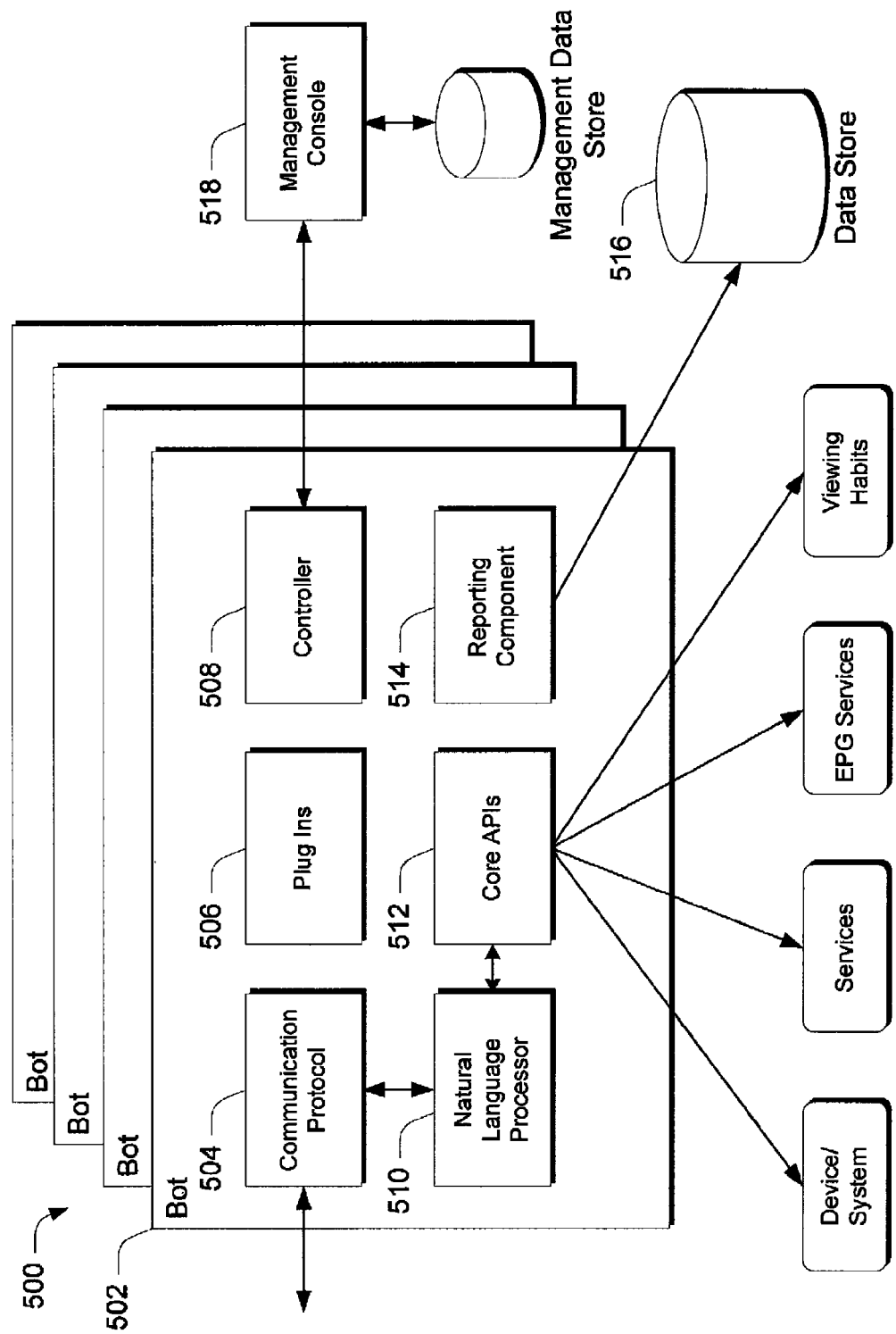
FIG. 5 illustrates a collection of bots in accordance with one embodiment.

FIG. 5 illustrates a collection of bots generally at 500, an example of which is specifically shown at 502 in accordance with one embodiment. In practice, individual servers in the presence based network can host a number of different bots and/or different types of bots. For example, such other different types can include, by way of example and not limitation, information retrieval bots (e.g., an MSN search bot, Encarta encyclopedia bot or shopping on Amazon.com like bot), a CRM bot (such as a support bot or a financial services bot that explains to existing customers different financial products that map to their financial position), an entertainment hot (playing word games, chatting, etc.), a product oriented bot (e.g., a bot that highlights the advantages of a particular product), and a personality bot (an example being a virtual DJ bot). The bots are typically implemented in software in the form of computer-readable instructions that reside on some type of computer-readable media.

In this example, bot 502 includes components that can implement the functionality described above. It is to be appreciated and understood that the specifically-illustrated bot constitutes but one exemplary bot that can implement the functionality described above. Accordingly, other bots can be utilized without departing from the spirit and scope of the claimed subject matter.

In this particular example, bot 502 includes, by way of example and not limitation, a communication protocol component 504, one or more plug in components 506, a controller component 508, a natural language processor 510, a core API component 512 and a reporting component 514 that utilizes a data store 516. A management console 518 is also provided.

Communication protocol component 504 is configured to communicate with the presence network and client application executing on the remote computing device. Component 504 handles all conversational aspects and capabilities. Any suitable communication protocol can be utilized. In the instant messaging embodiments, the protocol includes peer-to-peer capabilities.

Plug in components 506 can comprise any suitable components that provide additional functionality outside of the bot core. Examples can include, by way of example and not limitation, chat room support components, access to external data sources like flight reservation systems, public forums to access FAQs, gamer tag information such as that from Microsoft's Xbox Live, and the like.

Controller component 508 is configured to control and provide control functionality for bot 502. This can include communicating with a management console 518 to allow the bot to be programmed and reconfigured as desired. Controller component 508 can allow for bots to be started and stopped, track how many users are utilizing the presence network, show which plug ins are available and what services have been enabled to leverage with the core API component 512 discussed below.

Natural language processor 510 can comprise any suitable natural language processor. In some embodiments, the natural language processor is based on a scripted markup language which allows it to receive a request (as from communication protocol component 504) and then generate a response, as will be appreciated by the skilled artisan.

Core APIs 512 comprise a collection of APIs that are utilized to access or leverage outside services. That is, the core APIs 512 are configured to leverage available services by making and receiving programmatic calls to and from components that make up such services. For example, the core APIs can be used to access the user's device/system that is being programmed (using any suitable medium of communication), various other services (such as email and the like), EPG services, viewing habits services (such as those provided by media service 118 (FIG. 1)), and the like.

Reporting component 514 allows bot 502 to pass information to data store 516. This information can comprise any suitable type of information such as information about the bot's communication with various users, the various uses of the plug-ins, and the like.

In Operation

In operation, when a user engages a bot through for example, an instant messaging application executing on their remote computing device, the user's communication (whether textual, VoIP, voice clips) is received via communication protocol 504 and processed by natural language processor 510. In some instances, the natural language processor may include or otherwise have access to the services of a text-to-speech and/or speech-to-text module. For example, if the user's communication is received in the form of a voice clip, then the natural language processor may utilize a speech-to-text module to translate the speech into text. Similarly, responses generated by the natural language processor may then be translated from text to speech and then sent to the user. Such modules are known and, for the sake of brevity, are not described in additional detail.

Once the natural language processor processes the user's communication, the core APIs can be leveraged to access the appropriate services in responding to the user. For example, if the user's communication indicates that the user wishes to remotely program or otherwise access their device, then the core APIs can be utilized to access the device. Alternately or additionally, if the user wishes to access EPG data to see which programs are available, then the core APIs can be utilized to access an appropriate EPG service. Further, if a user wishes to access their viewing habits or those of their contacts, then the core APIs can be utilized to access the viewing habits. This notion is explored in more detail below in the section entitled "Social Networking".

Social Networking

Because the presence network supports the notion of contacts, and because the network has access to services that can maintain users' viewing habits, a bot can have the ability to access the viewing habits of all of a user's contacts (assuming, of course, that a particular contact has elected to allow such access). This can provide the opportunity for a rich and robust sharing experience. For example, in some scenarios, a bot can show a particular user's contacts which movies that user is or will be watching in the future and vice versa. For example, a user may ask a bot "What is Bob watching now?" or "what movies is Bob going to watch this week?" By having access to Bob's viewing habit information, the bot can then reflect this information back to the user.

In at least some embodiments, this social networking functionality can be accessed in a couple of different ways. For example, in some scenarios, the user can simply engage the bot in a conversation, as in the example above. Alternately or additionally, the user can click on a web window that represents a contact which would then alert the bot to the fact that the user desires to learn some information about Bob's viewing habits. In this case, the bot can begin feeding information to the user or otherwise intelligently expose the user to other cross-referenced information. For example, the bot may provide a list of movies that Bob is scheduled to view and may then, responsive to this list, provide the user with a listing of movies that Bob may not necessarily be scheduled to view, but which share a genre of the movies that Bob is scheduled to view.

Hence, in this embodiment, the bot is employed as a context discovery mechanism in which the context of a user's contacts can be discovered in relation to their interaction with a service, such as a television or gaming service. This enables other users to discover their contacts' habits even when their contacts are offline.

Conclusion

Various embodiments described above utilize a real-time instant messaging or presence based communications service as a mechanism to control the operation, programming, and review of media content on a device or system such as a television, media center, gaming device, digital video recorder, mobile device for consuming media and the like.

In addition, the use of the instant messaging or presence based communication system opens up various social networking options for users. For example, users can, if allowed, gain access to the viewing habits of individuals in their contact list and exchange information with one another to provide a rich, robust sharing environment. Alternately or additionally, the user can publish their own viewing habits information, such as preferences, recommendations and the like.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
 establishing, using an instant messaging application, communication with one or more bots using a presence based network and a presence server that maintains and updates real-time statuses associated with a plurality of contacts corresponding to a plurality of online users, each of the one or more bots being an executable application hosted on the presence server that are configured to:
  reside as contacts in the instant messaging application;
  engage in a human-like conversation with the plurality of online users;
  leverage use of the presence based network to determine media consumption habits of the plurality of contacts;
  provide recommendations to one or more of the plurality of online users based at least on the media consumption habits of the plurality of contacts;
  purchase content associated with the recommendations on behalf of the plurality of online users when a specified price point of the content is reached; and
  help the plurality of contacts manage safety viewing habits by generating notifications to one or more third persons of a time and program content being viewed by at least one of the plurality of online users;
enabling a user to remotely interact, via the one or more bots, with a device on which media is to be consumed by the user;
accessing, via the one or more bots, information associated with the media consumption habits of one or more of the plurality of contacts;
leveraging the information accessed to produce a media consumption recommendation for the user;
generating a notification to be sent to the user, the notification comprising the media consumption recommendation;
sending the notification to a remote computing device associated with the user;
receiving a remote media selection responsive to the media consumption recommendation;
purchasing the remote media selection on behalf of the user;
notifying the user of the remote media selection purchase; and
programming the device to consume media content associated with the remote media selection.

2. The method of claim 1, wherein enabling the user to remotely interact comprises textually engaging the one or more bots.

3. The method of claim 1, wherein enabling the user to remotely interact comprises engaging the one or more bots other than textually.

4. The method of claim 1, wherein establishing comprises presenting a user interface activity window configured to allow the user to take one or more actions with regard to the device or media that is consumed by the device.

5. One or more non-transitory computer-readable storage media comprising computer-executable instructions stored thereon, that configure one or more computing devices to perform the method of claim 1.

6. The method of claim 1, wherein the user proactively opens a conversation window engaging the one or more bots.

7. The method of claim 1, wherein the user is prompted by the one or more bots in response to a triggered event.

8. The method of claim 1, wherein the one or more third persons are a parent and the at least one of the plurality of online users is a child of the parent.

9. A computer-implemented method comprising:
  establishing communication, via a presence based network and a presence server that maintains and updates real-time statuses associated with a plurality of contacts corresponding to a plurality of online users, with an application executing on a client device, the establishing being performed, at least by one or more bots hosted on the presence server, the one or more bots being configured to:
    engage in a conversation with the plurality of online users;
    leverage use of the presence based network to determine media consumption habits of the plurality of contacts;
    provide recommendations to one or more of the plurality of online users based at least on the media consumption habits of the plurality of contacts;
    purchase content associated with the recommendations on behalf of the plurality of online users when a specified price point of the content is reached; and
    help the plurality of contacts manage safety viewing habits by generating notifications to one or more third persons of a time and program content being viewed by at least one of the plurality of online users;
  providing, via the application, one or more program-related recommendations based on the media consumption habits of the plurality of contacts maintained by a media service;
  responsive to the one or more program-related recommendations provided, interacting, via the presence based network, with a user of the client device to permit the user to take, via the application, programming-related actions and make programming-related decisions regarding a media consuming device that is remote from the client device;
  purchasing a media selection on behalf of the user based on a programming-related action taken by the user;
  notifying the user of the media selection purchase; and
  programming the media consuming device in accordance with the media selection purchase.

10. The method of claim 9, wherein establishing is performed by establishing communication with an instant messaging application executing on the client device.

11. The method of claim 10, wherein the one or more bots appear as contacts in the instant messaging application.

12. The method of claim 9, wherein interacting comprises having a human like conversation with the user of the client device.

13. The method of claim 12, wherein the human like conversation is textual.

14. The method of claim 12, wherein the human like conversation is not textual.

15. One or more non-transitory computer-readable storage media comprising computer-executable instructions stored thereon, that configure one or more computing devices to perform the method of claim 9.

16. The method of claim 9, wherein the one or more third persons are a parent and the at least one of the plurality of online users is a child of the parent.

17. A system comprising:
  one or more non-transitory computer-readable storage media comprising real-time statuses associated with a plurality of contacts corresponding to a plurality of online users;
  computer-readable instructions stored on the one or more computer-readable storage media that, when executed by one or more processors, permit the plurality of online users to selectively engage at least one of a plurality of bots, each bot being configured to perform a different type of functionality, each bot comprising:
    a client communication protocol component that is configured to engage in a human-like conversation with the plurality of online users via a presence based network;

one or more natural language processors that are configured to receive and process conversational input and generate responses to the conversational input; and a collection of application programming interfaces (APIs) that are configured to access outside services to provide the different types of functionality for each of the plurality of bots, wherein one bot is configured to help the plurality of contacts manage safety viewing habits by generating notifications to one or more third persons of a time and program content being viewed by at least one of the plurality of online users.

18. The system of claim 17 further comprising the presence based network over which communication takes place.

19. The system of claim 17, wherein the plurality of bots further comprise at least two of:

an information retrieval bot that searches the outside services for information desired by a contact;

a financial services bot that explains to the plurality of contacts different financial products associated with the outside services;

an entertainment bot that plays games with the plurality of contacts; and a product oriented bot that highlights advantages of a particular product associated with the outside services.

* * * * *